UNITED STATES PATENT OFFICE.

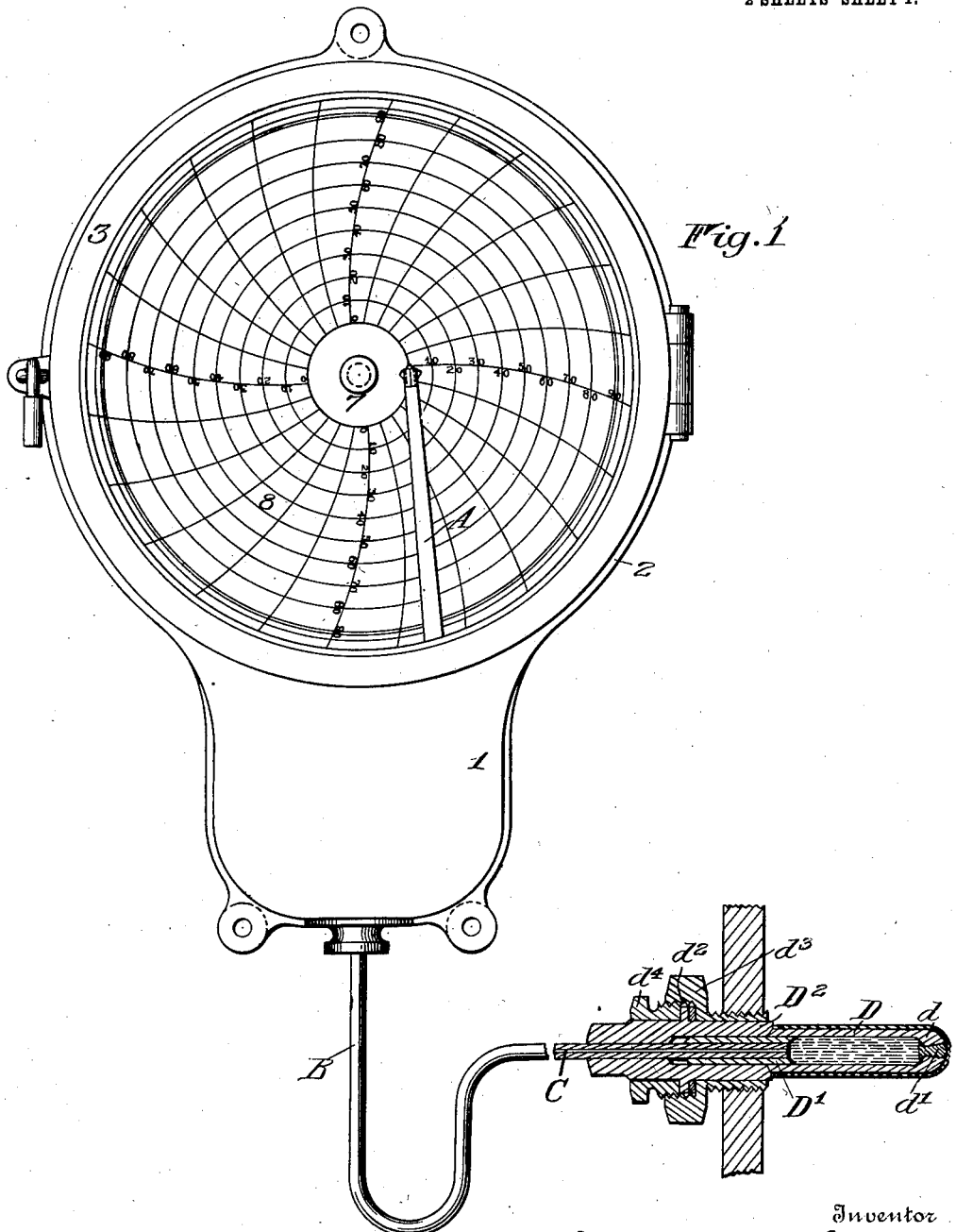

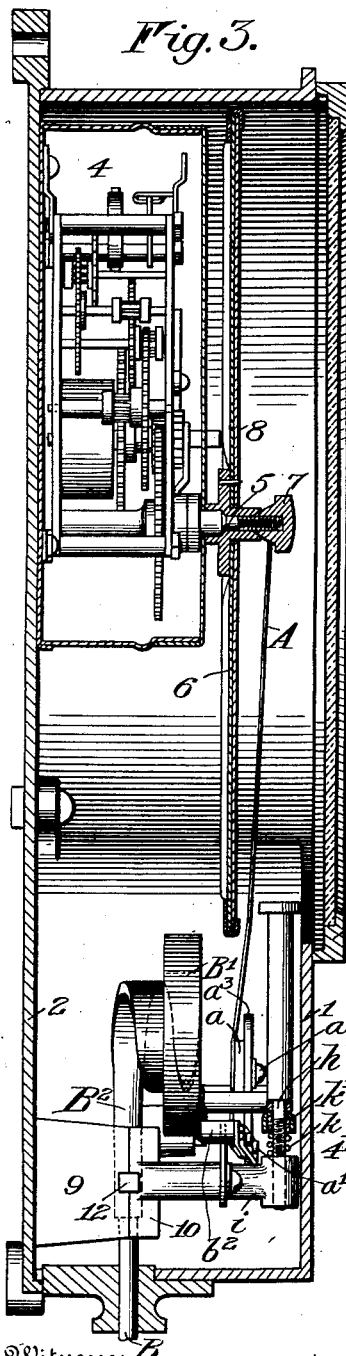
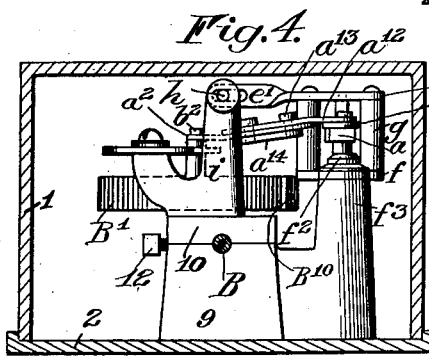
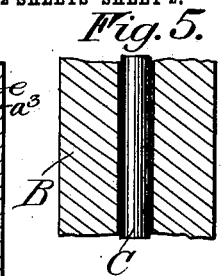
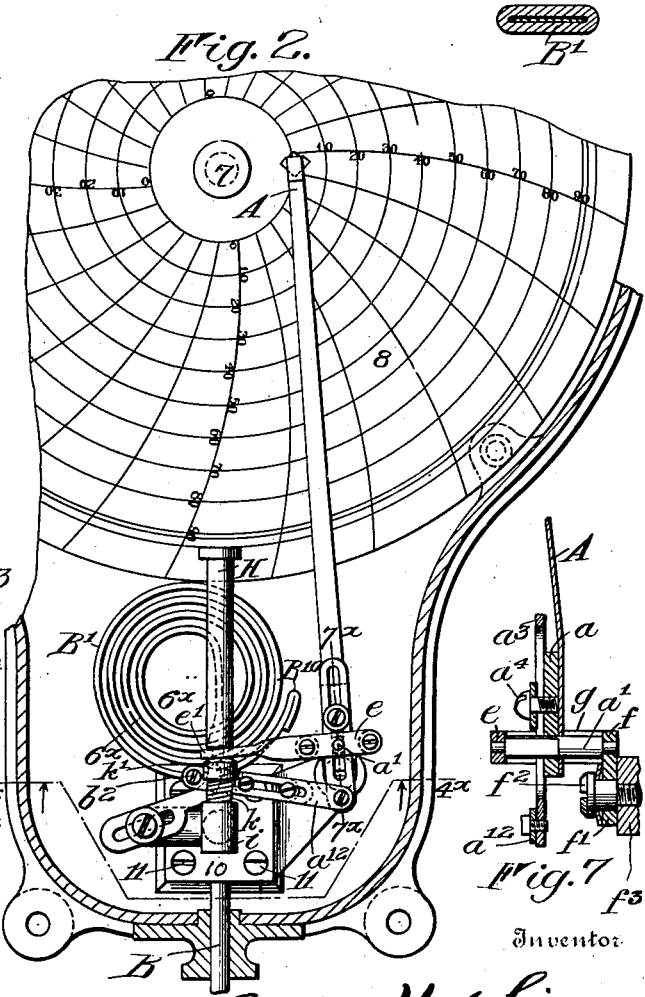
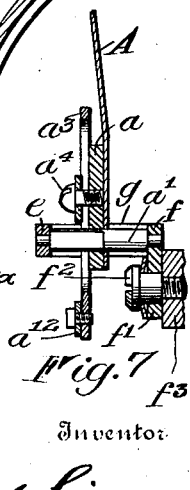

EDWIN HODGKINSON, OF ROCHESTER, NEW YORK, ASSIGNOR TO TAYLOR INSTRUMENT COMPANIES, OF ROCHESTER, NEW YORK, A CORPORATION OF NEW YORK.

INDICATOR AND RECORDER.

1,063,349.   Specification of Letters Patent.   Patented June 3, 1913.

Application filed October 3, 1910. Serial No. 585,014.

*To all whom it may concern:*

Be it known that I, EDWIN HODGKINSON, of Rochester, in the county of Monroe and State of New York, have invented certain new and useful Improvements in Indicators and Recorders; and I do hereby declare the following to be a full, clear, and exact description of the same, reference being had to the accompanying drawings, forming a part of the specification, and to the reference-numerals marked thereon.

My present invention has for its object to provide an indicating and recording apparatus and particularly one for indicating and recording temperatures, which is adapted to be used in connection with different processes in the arts in which it is deemed advisable to maintain more or less even temperatures during a given period of time.

In this connection my invention has for its particular object to provide an instrument in which the indicating and recording mechanism may be located at a distance from the point at which the record is to be taken, and to this end I have provided an improved form of capillary or fluid pressure operated tube.

To these and other ends the invention consists in certain improvements and combinations of parts all as will be hereinafter more fully described, the novel features being pointed out in the claims at the end of the specification.

In the drawings: Figure 1 is a view showing in elevation the indicating and recording mechanism, and illustrating in section the capillary tube employed in conjunction therewith, and constructed in accordance with my present invention. Fig. 2 is an enlarged detail view showing the mechanism employed for adjusting the stylus, part of the outer casing being shown in section. Fig. 3 is a view partly in section showing in elevation the parts illustrated in Fig. 2, together with the clock train employed for operating the record sheet. Fig. 4 is a sectional view taken on the line $4^x$—$4^x$ of Fig. 2, looking in the direction indicated by the arrows. Fig. 5 is an enlarged sectional view showing a longitudinal portion of the capillary tube. Fig. 6 is an enlarged sectional view of one convolution of the active portion of the capillary tube taken on the line $6^x$—$6^x$ of Fig. 2, and Fig. 7 is a detail sectional view taken on the line $7^x$—$7^x$ of Fig. 2.

Similar reference numerals in the several figures indicate similar parts.

An instrument constructed in accordance with my present invention is adapted particularly to be used for indicating and recording continuously temperatures which are maintained for given periods of time in carrying out different processes of manufacture, such as in enameling rooms, cooking vats or kettles, and the like.

Generally the apparatus comprises a continuously movable recording sheet or chart, a stylus movable relatively thereto, and a thermometer stem connected to the stylus and adapted to actuate it in one direction or the other as the temperature may be increased or diminished, the fluctuation in temperature being recorded by a line or mark traced upon the chart.

In illustrating my present invention I have shown a recording instrument comprising a casing 1 mounted upon a backing 2, which may be secured to any convenient support, the front of the casing being closed by a hinged door 3 provided with a glass panel. Within the casing is a clock train 4 having a driven arbor 5 on which is detachably secured a metal disk 6 held in place by a thumb screw 7, and adapted to support the removable recording sheet or chart, indicated by 8, provided with suitable lines or graduations. It will be understood, however, that in place of a rotatable chart other forms of continuously moving recording surfaces may be employed, illustration of which is, however, omitted as these parts are merely shown to illustrate the operation of the recording device, and these in no wise affect the operation of the mechanism by which the record is obtained.

The recording instrument comprises two main parts, the first known as the stylus indicated by A, and a capillary, or thermometer tube or stem B, the latter being provided with an active end B′ capable of expansion and contraction under varying degrees of temperature and connected to the stylus to effect a corresponding movement thereof across the face of the chart sheet. The capillary tube contains an expansive fluid, such as mercury, and at its extremity is connected with a reservoir or chamber for the fluids, which is located in the vessel or room, the temperature of the air or other contents of which it is desired to obtain a record. On account of the high pressure to which the capillary tube is subjected the walls of the latter are necessarily considerably thicker in cross section than the internal bore of the tube. The latter is preferably made of drawn metal, but owing to the fact that in the manufacture of these tubes it is impossible to reduce the caliber of the bore to anything like the cross sectional area of the bore of the ordinary glass thermometer stem, and at the same time to maintain its uniformity, it has heretofore been considered impracticable to attempt to obtain accurate temperature records if the recording stylus was not located in proximity to the bulb of the thermometer. This is due to the comparatively large volume of the expansive fluid contained in the capillary tube, which it will be understood necessarily increases in volume as the length of the tube is increased. For this reason very unsatisfactory and inaccurate records have resulted in any attempt to separate the recording part of the instrument any considerable distance from where the temperature occurs which is to be recorded. In order to overcome these difficulties and to produce an instrument which is sensitive to slight variations in temperature, I have devised means for reducing the bore of the capillary tube to such an extent that the quantity of expansive fluid contained in a tube of given length is reduced to a minimum. In carrying out this feature of my invention a capillary tube B is selected having the smallest bore which it is practicable to form in a tube of the desired cross section. For example, a steel drawn tube of seven thirty-seconds of an inch external diameter will have a bore of approximately twenty-one thousandths of an inch. A tube of this character and of the desired length is first selected and into it is slipped a wire, preferably a steel wire, of as large a diameter as can be forced into said bore by hand. The upper or active end of the capillary tube may or may not contain the wire, as this being flattened in cross section, as shown in Fig. 6, it is possible to accurately gage the area of this part of the tube. It is practicable to omit the wire from this end of the tube, and I prefer to form the latter in a separate piece, as this being much shorter, may be more conveniently handled and curved accurately into the spiral B', as shown in Fig. 2. When making this end in a separate piece, I preferably select stock which is somewhat larger in diameter than the tube B, so that the end $B^2$ may be drilled to receive the extremity of the capillary tube B containing the wire, and to which it is welded, soldered or otherwise secured to form an air tight joint. The upper end of the capillary tube lies within an enlargement on the bottom of the casing 1 where it is rigidly supported on a boss 9 against which it is held by a face plate 10 removably secured by screws 11, a set screw 12 also being employed to bear against the side of the tube to insure perfect rigidity. The lower end or outer extremity of the capillary tube is fitted to the bulb or chamber D, and the latter is supported in a mounting, whereby it may be conveniently connected to the wall of the room or vessel. The bulb or chamber D is preferably made of steel, one end of which is open, the opposite extremity being thickened, as indicated at $d$, and provided with a taper aperture which is closed by a plug $d'$. Inserted in the open end of the chamber is a plug D' surrounding the extremity of the capillary or thermometer tube B, both of these parts being in turn surrounded by a sleeve $D^2$ provided centrally with an annular shoulder $d^2$ against one side of which is fitted a threaded thimble $d^3$, adapted to enter a support or the wall of a vessel, as shown in Fig. 1, and against which the flange is clamped by a locking nut $d^4$. The outer end of the chamber $d$ is made considerably thicker than the adjoining side walls for the express purpose of providing a sufficient body of material to enable a taper plug to be firmly driven therein, as I have demonstrated in practice that this is the best and most satisfactory means of closing the bulb after it has been filled with the expansive fluid. The angle on which the conical walls of the aperture and plug are cut and the length of the latter, as well as the distance it is driven into the tube, are important and in practice I make these parts of such proportion that the inner end of the plug is compressed slightly when forced into its seat, and it is driven inwardly until its inner or smaller end projects into the chamber, when its extremity projecting beyond the edge of the aperture is permitted to expand so that it is practically impossible to remove the plug or in any way cause it to be loosened by the internal pressure in the chamber. Consequently an absolutely tight joint is formed when the chamber is closed. When the parts are thus united, the outer end of the pin is trimmed off and the exterior of the chamber is covered with a coating of copper, preferably an electrolytic deposit.

In the construction of the apparatus the parts are united as above described, that is, after the stem or filler C has been inserted in the tube B, the active end or spiral B' is applied to the upper end thereof and the bulb D is secured to the lower end. At this time both ends of the tube are open and the end of the spiral is connected to any suitable form of air exhausting apparatus, while the lower end of the bulb is immersed in the fluid with which the tube is to be filled, preferably a mercury bath. The exhausting of the air continues until the mercury or other fluid completely fills the capillary tube, the active end thereof and the bulb. The extremity of the active end is then closed by bending over and pounding down the extremity $B^{10}$ of the spiral and then the plug $d'$ is inserted in the end of the chamber. After this has been accomplished the range of the instrument is then determined by giving the bulb D the necessary amount of compression to impart the initial set to the active portion of the capillary tube. The compression of the fluid expands the active or spiral end of the tube, causing it to unwind more or less, which is determined according to the degree of temperature at which it is previously determined a particular instrument shall become effective.

If the instrument is intended to be used for recording normal atmospheric temperatures, it is necessary to compress the contents of the bulb after the latter is closed by means of dies until the expansive fluid is placed under a pressure sufficient to insure uniform motion of the indicating arm at all points between the extremes of movement of the indicating arm within the range of the instrument which may be from as low as 40 degrees below zero to 200 degrees above zero. Instruments of this character used for some purposes are not required to become effective until a comparatively high temperature, such as 200° Fahrenheit, has been reached, and in an instrument designed for such high temperature the bulb need not be compressed. This means of providing an initial tension in the fluid I consider especially important, as it increases the efficiency, sensitiveness and accuracy of the instrument for low temperatures, and where the capillary tube is of several feet in length it obviates the necessity of correcting the reading due to a variation in atmospheric temperatures to which the tube may be subjected through the distance over which it extends from the bulb to its point of connection with the stylus.

It is essential in an apparatus of this character that a means be provided for adjusting the stylus relatively to the zero point or line of the scale, or to some other arbitrary division thereon, and when so adjusted it will be capable of continued accurate operation. Carrying out this feature of my invention, the arm A supporting the stylus is a light spring connected at its lower end to a plate $a$ rigidly attached to an arbor $a'$. The latter is journaled in a swinging or rocking frame comprising the front and rear pieces $e$, $f$, the latter having a downwardly extending end $f'$, pivoted on a screw $f^2$ secured in a post $f^3$ projecting forwardly from the plate 2. The frame pieces $e$, $f$, are separated by spacing members $g$, $g$, and one end of the frame piece $e$ projects laterally, as indicated by $e'$, where it is slotted to accommodate an adjusting screw $h$, and the lower end of the latter is threaded in a forwardly extending bracket $i$ on the cap piece 10. The upper end of the screw is arranged in proximity to the lower edge of the door opening in the casing where access may be conveniently had to it. The screw is also provided with a shoulder which engages the upper edge of the arm with which the latter is held in contact by a coil spring $k$, its upper end being inclosed in a cap $k'$. From this arrangement of the parts it will be observed that with the rotation of the screw in one direction the arm $e$ will be depressed to rock the frame about the screw $f^2$, thus shifting the position of the arbor $a$, the slight movement occurring at this point being sufficient to cause the stylus to be shifted laterally to a considerable distance.

An articulated connection is provided between the arm A and the spiral or active end of the capillary tube comprising a link $a^2$ which is pivoted to the end of the arm and to a post or projection $b^2$ attached to the outer convolution of the spiral $B'$. In forming this operating connection I provided therein means for accomplishing two adjustments of the stylus, both of which are independent of the swinging of the arbor $a'$ around its pivotal support $f^2$ by means of the set screw $h$. In carrying out this feature of my invention instead of connecting the arm $a^2$ directly to the arm A, I interpose between these parts a slotted link $a^3$ which is held in adjusted position by a set screw $a^4$, the lower end of the link forming an extension of the arm A, and adjustable vertically relatively to the pivot $a'$ for the purpose of determining the amplitude of the movement to be given the stylus, which it will be understood depends upon the range through which the instrument is adapted to operate, and dependent upon the amount of movement which it is expected to obtain in the active end or spiral of the capillary tube. This adjustment also affords a means of setting the stylus for making records upon charts of different sizes or chart sheets having different forms of graduations. The second adjustment, referred to above, operates in conjunction with the shifting action of the pivot $a'$ and is accomplished by making the arm $a^2$ in two parts, the second part comprising the link $a^{12}$ (Figs. 2 and 4,) both of the latter and the part $a^2$ being slotted and overlapping and rigidly clamped together by set screws $a^{13}$ carried in a clamping plate $a^{14}$. By loosening the screws $a^{13}$ the length of the arm may be increased or diminished to position the pen point or stylus in the approximate position desired in reference to the zero line or any other graduation on the chart, and should it be necessary to afterward shift the position of the pen point this may be accomplished by the finer adjustment afforded by the set screw $h$.

I claim as my invention:

1. A stem for recording thermometers comprising a capillary tube provided at one end with a bulb adapted to contain an expansive fluid and at the opposite extremity with a portion adapted to be rendered active by the action of said fluid, said tube having its interior area reduced by a longitudinally extending filling piece closely fitting the interior of the tube throughout substantially its entire length.

2. A thermometer capillary tube having a longitudinally extending bore provided with a closely fitting filling piece introduced therein and extending substantially its entire length.

3. A tube adapted to be used as a capillary tube for thermometers having a longitudinally extending bore provided with a closely fitting filling piece inserted lengthwise therein which reduces the area of the bore but does not completely close it.

4. A flexible thermometer capillary tube having a flexible filling piece extending throughout substantially the length of its bore.

5. A thermometer capillary tube having a bulb at one end and an active portion at its opposite extremity, said bulb and tube containing expansive fluid and provided with a filling piece in its bore extending from the bulb to the active portion to reduce the volume of expansive fluid in said tube.

6. In a capillary tube for recording thermometers, the combination with a metallic tubing provided with a bore of given diameter, of a wire inserted therein and extending substantially throughout the length of the tube, said wire being of a diameter to form a tight slip fit in the bore.

7. In a capillary tube for recording thermometers, the combination with a tube having an active portion at one end, and a metallic bulb at the other end containing fluid, of a wire partially filling the bore of the tube between the bulb and active portion, said bulb being subjected to compression to displace the fluid therein to cause it to impart an initial set to the active portion.

8. In a capillary tube for recording thermometers, the combination with a metallic tube of given length, a separately formed spirally wound active portion secured to one end of the tube and a separately formed bulb attached to the opposite end of the tube, of a wire filling piece inserted in the bore of the tube and extending throughout its length, the active portion of the bulb being filled with fluid and said bulb being compressed to displace a part of the fluid to impart an initial set to said active portion.

EDWIN HODGKINSON.

Witnesses:
G. WILLARD RICH,
RUSSELL B. GRIFFITH.